(12) United States Patent
Zuo et al.

(10) Patent No.: US 11,636,291 B1
(45) Date of Patent: Apr. 25, 2023

(54) CONTENT SIMILARITY DETERMINATION

(71) Applicant: Amazon Technologies, Inc., Seattle, WA (US)

(72) Inventors: Zhen Zuo, Bothell, WA (US); Lixi Wang, Redmond, WA (US); Jianfeng Lin, Bellevue, WA (US); Yi Sun, Bellevue, WA (US); Michinari Momma, Kirkland, WA (US); Yikai Ni, Seattle, WA (US); Wenbo Wang, Seattle, WA (US); Xiangdong Qian, Bothell, WA (US); Deqiang Meng, Kenmore, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 245 days.

(21) Appl. No.: 16/996,528

(22) Filed: Aug. 18, 2020

Related U.S. Application Data (60) Provisional application No. 63/005,870, filed on Apr. 6, 2020.

(51) Int. Cl.
*G06K 9/62* (2022.01)
*G06N 20/20* (2019.01)
*G06V 30/413* (2022.01)

(52) U.S. Cl.
CPC ......... *G06K 9/6276* (2013.01); *G06K 9/6257* (2013.01); *G06N 20/20* (2019.01); *G06V 30/413* (2022.01)

(58) Field of Classification Search
CPC .... G06K 9/6276; G06K 9/6257; G06N 20/20; G06V 30/413
See application file for complete search history.

(56) References Cited

U.S. PATENT DOCUMENTS

| | | | |
|---|---|---|---|
| 2010/0010919 A1* | 1/2010 | Hudak | G06Q 30/0601 705/26.1 |
| 2018/0157681 A1* | 6/2018 | Yang | G06F 16/583 |
| 2018/0189635 A1* | 7/2018 | Olarig | G06N 3/0454 |
| 2018/0197223 A1* | 7/2018 | Grossman | G06V 10/25 |
| 2020/0380027 A1* | 12/2020 | Aggarwal | G06N 20/00 |
| 2021/0117773 A1* | 4/2021 | Sollami | G06K 9/6218 |
| 2021/0158177 A1* | 5/2021 | Sancheti | G06N 3/006 |
| 2022/0012297 A1* | 1/2022 | Basu | G06F 16/9538 |

* cited by examiner

*Primary Examiner* — David Perlman
(74) *Attorney, Agent, or Firm* — K&L Gates LLP (57) ABSTRACT

Systems and techniques are generally described for determining similar content. First embedding data may be generated for first content based at least in part on a specified similarity task. A first query comprising the first embedding data may be generated and sent to a first database partition. A first search result representing second content may be determined using the first embedding data. A second query comprising the first embedding data may be generated and sent to a second database partition different from the first data base partition. A second search result representing third content may be determined using the first embedding data. In some examples, output data comprising at least one of the first search result and the second search result may be generated. The output data may represent content classified as similar to the first content.

20 Claims, 7 Drawing Sheets

CONTENT SIMILARITY DETERMINATION

CROSS-REFERENCE TO RELATED APPLICATIONS

This application claims the benefit of U.S. Provisional Application No. 63/005,870, filed Apr. 6, 2020, the disclosure of which is incorporated herein by reference in its entirety.

BACKGROUND

Similarity systems attempt to determine a degree of similarity between a selected piece of content and other content. Similarity systems can be used in a wide variety of contexts with differing goals and differing definitions of "similarity." For example, in the product context, there may be different dimensions of similarity including appearance, price, brand, etc. In some other contexts, visual similarity alone may determine a degree of similarity. In some other contexts, semantic similarity may be more important (e.g., for determining similar articles, books, etc.) than visual similarity. Typically, machine learning models and/or rule-based approaches are developed and/or are tailored for the particular similarity task at hand.

DETAILED DESCRIPTION

In the following description, reference is made to the accompanying drawings that illustrate several examples of the technology described herein. It is understood that other examples may be utilized and various operational changes may be made without departing from the scope of the present disclosure. The following detailed description is not to be taken in a limiting sense, and the scope of the embodiments described herein is defined only by the claims of the issued patent.

Identifying similar content such as products, images, books, movies, and/or other content, is a common computer-implemented task and can be used in a wide variety of contexts from recommendation systems to medical diagnoses. Two common challenges associated with similarity determination systems and/or methodologies are: 1) variable definitions of what it means to be "similar," and 2) scalability in large datasets. The definition of "similarity" can vary across different applications. For example, in a first context, similarity may mean "near identical" products sold by different vendors. In a different context, "similarity" may mean products that are substitutable to each other for customers with common interests. In another context, "similarity" may mean personalized products that are visually similar in terms of design pattern, style, and/or color. Due to the differing definitions of "similarity" in these and other contexts, it is difficult to build a general solution for all similarity-determination scenarios. Additionally, similarity determination systems may be tasked with computing pair-wise similarities among millions and/or billions of content items. Such large-scale computation is resource intensive leading to several challenges associated with large-scale data processing. Described herein are flexible and consolidated similarity-determination systems and techniques that may high performance even when dealing with large datasets. Additionally, the various systems and techniques described herein provide a high degree of scalability.

In various examples described herein, content similarity services may leverage Deep Neural Networks and distributed computing technology to serve diverse large-scale product similarity computations. The various techniques described herein can return highly relevant similar products in both verification and ranking tasks, and exhibit a high degree of computing efficiency and system scalability on large data volumes.

In various examples, the systems and techniques described herein may allow for flexibility in terms of content informational input. For different applications, the various systems and techniques described herein provide the flexibility for input content information selection. For example, for visual similarity recommendations, product image may be the key information to use, while for substitute product identifications, image, title, and description may all be important clues for similar product identification.

In various examples, the systems and techniques described herein may allow for different optimization goals. The various systems and techniques described herein are flexible enough to optimize the output goals of different applications. For example, in a visual search application, the goal may be to return content with similar visual patterns to a particular query image in a ranking order. In another example, in a "substitute products" recommendation, the goal may be to identify products that can be replaceable by each other when customers make purchase decisions.

In various examples, the systems and techniques described herein may allow for key attribute matching among different applications. The various systems and techniques described herein may have the flexibility to explicitly remove unqualified items that are classified as "similar" using post filters. For example, for substitute phone case recommendations, if a customer is exploring a phone case for a first phone type, the post filter may remove phone cases that are not compatible with the first phone type.

The various content similarity determination systems and techniques described herein may provide a high degree of scalability and efficiency to handle large-scale data processing. For example, the systems and/or techniques described herein may be capable of processing large and continuously growing content sets, and may publish refreshed similarity results within controllable time frames. Furthermore, the various systems and techniques described herein may manage the computing resource (e.g., CPU/GPU usage and memory usage) to optimize for cost. The various processing described herein involves efficient and scalable image and text embedding computation from deep neural networks and large item indexing for similarity search. In various examples, the systems and/or techniques described herein may identify and cache pre-computed results to impart result reusability across different applications without duplicated computations.

Currently, many content recommendation systems focus on providing highly specialized solutions optimized for very specific application scenarios. Such specialized solutions are not flexible enough to support multiple applications. In general, in current systems designed for a particular application, there are typically two types of signals for computing similarity: product contextual information and customer behavior information.

Content based similarity identification systems have been adopted throughout industry that typically aim to return items with highly-similar contextual information (e.g., image, video, description, attribute, etc.) to the query item. For example, visual search systems focus on learning image representations optimizing for an image retrieval problem. Another highly developed direction is content-based recommendation that leverages contextual information to recommend content with similar category/search tokens, etc. Behavior-based recommendation systems are also widely applied. Behavior-based recommendation systems typically aim to recommend items viewed/purchased by other users with similar preferences.

The various content similarity determination systems and techniques described herein support a hybrid of contextual and behavior-based signals in similarity modeling, and provides enough flexibility to choose any combination for different applications (e.g., product image, purchase behavior, combination of image & title & behavior, etc.). Moreover, the various content similarity determination systems and techniques also allow users to provide their own definition of similarity to support different applications. For example, the content similarity determination systems and techniques described herein support identical products searching, visually similar products recommendation, content substitutes, etc.

Machine learning techniques, such as those described herein, are often used to form predictions, solve problems, recognize objects in image data for classification, etc. For example, herein machine learning techniques may be used to determine substitute items for a given item. In various examples, machine learning models may perform better than rule-based systems and may be more adaptable as machine learning models may be improved over time by retraining the models as more and more data becomes available. Accordingly, machine learning techniques are often adaptive to changing conditions. Deep learning algorithms, such as neural networks, are often used to detect patterns in data and/or perform tasks.

Generally, in machine learned models, such as neural networks, parameters control activations in neurons (or nodes) within layers of the machine learned models. The weighted sum of activations of each neuron in a preceding layer may be input to an activation function (e.g., a sigmoid function, a rectified linear units (ReLu) function, etc.). The result determines the activation of a neuron in a subsequent layer. In addition, a bias value can be used to shift the output of the activation function to the left or right on the x-axis and thus may bias a neuron toward activation.

Generally, in machine learning models, such as neural networks, after initialization, annotated training data may be used to generate a cost or "loss" function that describes the difference between expected output of the machine learning model and actual output. The parameters (e.g., weights and/or biases) of the machine learning model may be updated to minimize (or maximize) the cost. For example, the machine learning model may use a gradient descent (or ascent) algorithm to incrementally adjust the weights to cause the most rapid decrease (or increase) to the output of the loss function. The method of updating the parameters of the machine learning model is often referred to as back propagation.

Generally, in machine learning, an embedding is a mapping of a discrete, categorical variable to a vector of continuous numbers. In neural networks, embeddings are typically of lower dimensions relative to the data that the embeddings represent. In various examples, token embeddings may be generated to represent various text (e.g., review snippets) described herein for input into the various machine learning models described herein.

Figure 1:
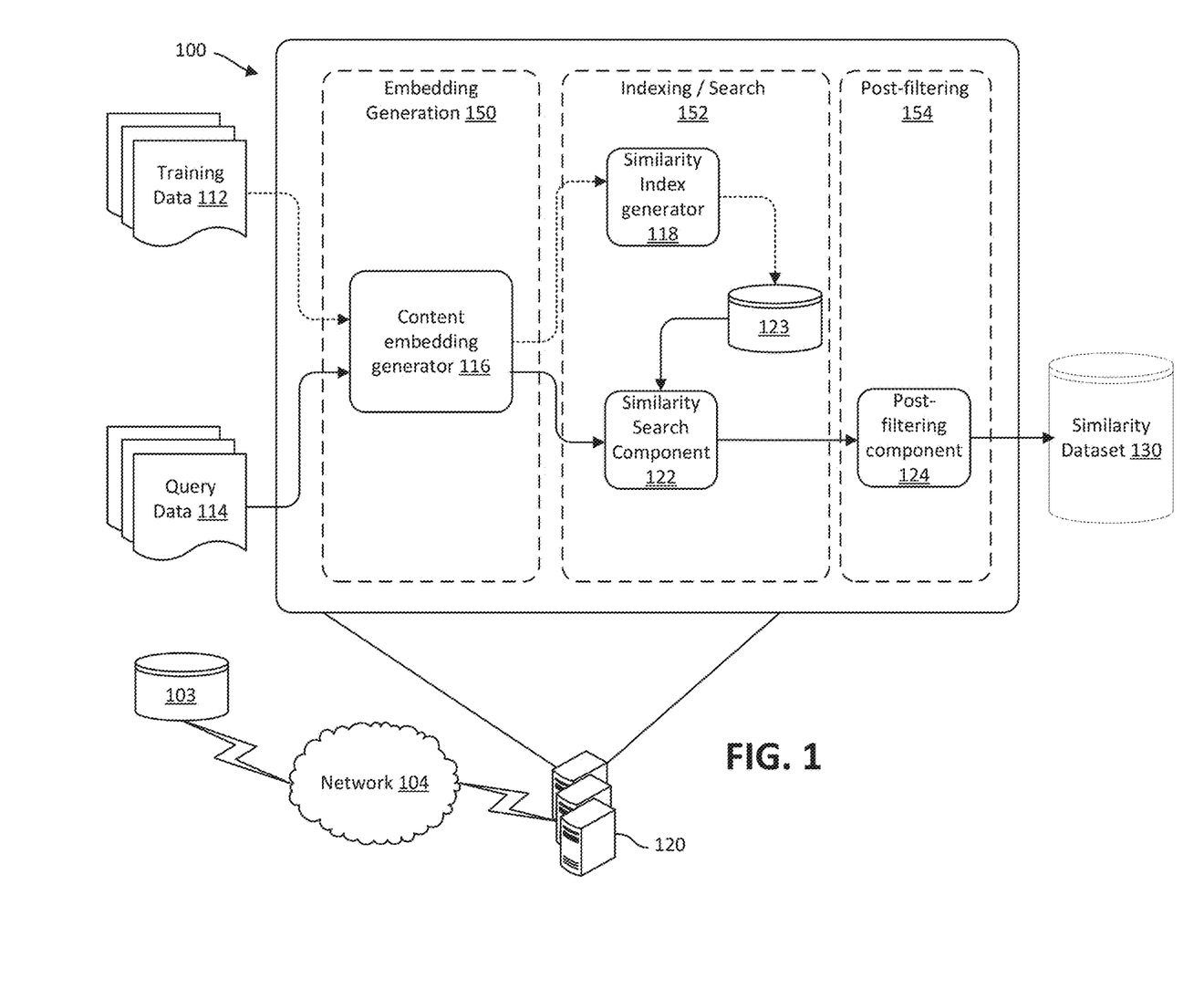
FIG. 1 is a block diagram depicting an example system effective to determine content similarity, according to various embodiments of the present disclosure.

FIG. 1 is a block diagram depicting an example content similarity determination system 100 effective to determine content similarity, according to various embodiments of the present disclosure. In various examples, one or more computing devices 120 may be used to implement the content similarity determination systems and/or techniques described herein. Computing devices 120 may communicate with one another and/or with one or more of the other components depicted in FIG. 1 over a network 104 (e.g., a local area network (LAN) and/or a wide area network (WAN) such as the internet). For example, computing devices 120 may communicate with a non-transitory computer-readable memory 103 over network 104. In various examples, the non-transitory computer-readable memory 103 may store instructions that, when executed by at least one processor of the computing devices 120, may cause the computing devices to perform the various content similarity determination actions described herein.

The content similarity determination system 100 may comprise embedding generation 150 which may generate embedding data representing query content (e.g., items or other content represented by query data 114). Additionally, content similarity determination system 100 may comprise indexing/search 152 which may use similarity index generator 118 to generate a distributed similarity index for all content relevant to the similarity determination (e.g., for a product catalogue and/or recommendation system). Additionally, content similarity determination system 100 may comprise post-filtering 154, which may apply explicit post-filtering to filter out content classified as "similar," but which does not have one or more pre-specified attributes and/or filter values. The content similarity determination system 100 may generate a similarity dataset 130 for a particular content dataset. The similarity dataset 130 may associate a ranked list of similar items for each content item of the relevant dataset of content items. The ranked list of similar items may be determined using the particular embedding generation techniques and the particular post-filters specified for the particular entity. Accordingly, different entities may customize the similarity determination task for their own individualized purposes, and may generate similarity datasets 130 that are optimized for their particular application(s). In various examples, the different entities may send data representing a similarity task (e.g., training data comprising pair-wise training data, as described below). The various systems and techniques described herein may determine similarity features and/or embeddings based on the specified similarity task.

In FIG. 1, dashed lines indicate model training and/or pre-processing steps used to configure the content similarity determination system 100, while solid lines indicate a query phase wherein a content similarity determination is made for one or more input content items (e.g., input content items represented by query data 114).

Embedding generation 150 may comprise a content embedding generator 116. Content embedding generator 116 may comprise generation of a feature vector representing the particular input content. In various examples, the feature vector may be a compound feature vector (e.g., compound feature data) representing various attributes of the input content item. Additionally, the feature vector may be optimized for similarity determination, as described below in reference to FIG. 3. Furthermore, the feature vector generated by content embedding generator 116 may be content embedding data that is optimized for a particular similarity-determination task. For example, if the similarity determination task is purely to determine visual similarity, the content embedding generator 116 may generate a visual feature vector that represents one or more images of the input content item. Conversely, in an e-commerce setting, the content embedding generator 116 may determine embedding data that represents a description, a title, one or more images of the content, and/or user behavior representing user interactions with respect to the content. As described in further detail below, various machine learning models of the content embedding generator 116 (and of the embedding generation 150, more generally) may be trained using training data 112. Training data 112 may comprise pair-wise data comprising data describing a first item (e.g., a feature vector representing one or more attributes of the first item), data describing a second item (e.g., a feature vector representing one or more attributes of the second item), and one or more labels (e.g., ground truth data indicating a similarity classification of the first item with respect to the second item).

Upon determination of embedding data representing an input content item (e.g., of query data 114) by content embedding generator 116, the embedding data may be included in one or more queries that may be used to query different partitions of a similarity index 123. During training, all content embeddings may be converted into index artifacts based on their similarity correlations. The similarity index 123 may be a data structure that is distributed across multiple compute nodes and/or memories. The similarity index 123 may comprise other embedding data representing all content (or a designated subset thereof) in the relevant similarity determination dataset. In various examples and as described in further detail below, queries including the embedding data representing the input content item may be sent to each database partition of the similarity index 123 and may be used by similarity search component 122 in parallel to determine search results for each partition, as described in further detail below. The search results may be merged by similarity search component 122 and sent to post-filtering component 124.

Post-filtering component 124 may compare metadata representing attributes of the merged search results with filter data specifying a content attribute. Post-filtering component 124 may filter out search results that do not include the attributes specified for the current similarity-determination task. For example, a similarity determination task may receive input query data 114 corresponding to a particular style of a dress. After generating embedding data representing the dress and performing a search of similarity index 123, a plurality of search results representing other dresses determined to be similar to the input dress may be determined. However, the post-filtering component 124 may specify that all dress have the attribute color=yellow. Accordingly, dresses that do not include such an attribute (e.g., dresses that are not yellow) may be removed from the search results output by the content similarity determination system 100.

As previously described, the output data generated by the content similarity determination system 100 may be used to generate a similarity dataset 130. In the example above where the input content item is a yellow dress, the similarity dataset 130 may include data representing the yellow dress in association with data representing the items determined by the content similarity determination system 100 to be most similar to the yellow dress. Additionally, the similarity dataset 130 may associate all content (or a specified subset thereof) in the dataset input into the content similarity determination system 100 with similar content. In various examples, content classified by the content similarity determination system 100 as "similar" to particular input content may be associated with a similarity score indicating a degree of similarity (in terms of the particular configurations selected for the content similarity determination system 100) to the input content. Accordingly, for a given content item, content classified as similar to that item may be ranked using such similarity scores.

Figure 2:
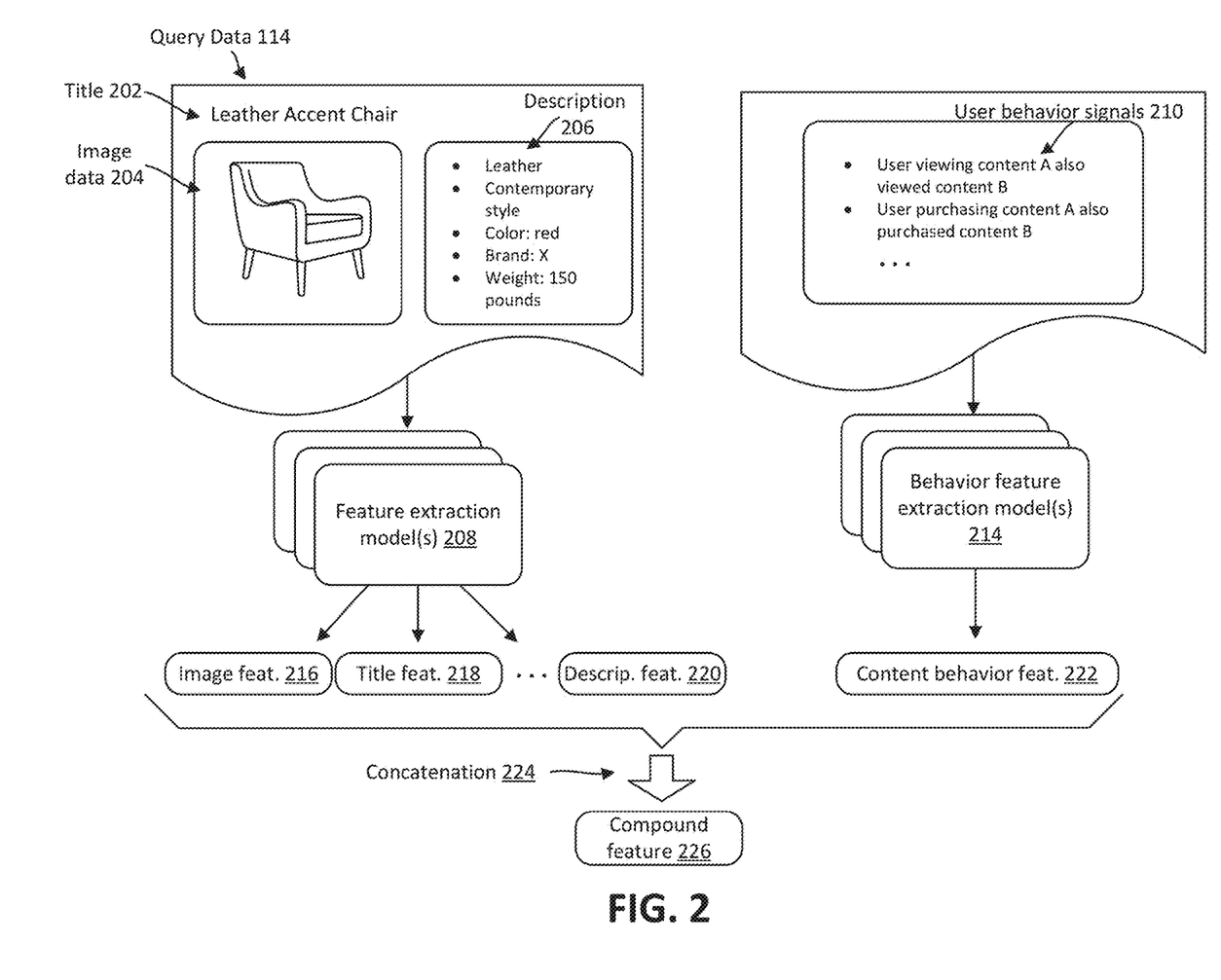
FIG. 2 depicts generation of a compound feature vector for content similarity determination, in accordance with various aspects of the present disclosure.

FIG. 2 depicts generation of a compound feature vector for content similarity determination, in accordance with various aspects of the present disclosure. The various components in FIG. 2 may be used to generate a compound feature vector representing a content item. The feature vector may concisely encode key product information used for similarity identification. However, as previously described, the definition of "similarity" may differ between different applications.

For example, similar shoes may usually have a similar "heel type," but this similarity criteria may not be suitable for other content (e.g., electronic devices, furniture). One common solution is to carefully select suitable input signals and similarity criteria for each application. However, such an approach is neither scalable nor efficient. To build a flexible product embedding learning framework, the various techniques described herein use common content information applicable for multiple different types of content (e.g., image, title, description, customer behavior responses, etc.) as input signals. The various optimization goals may be customized by learning from pair-wise (e.g., similar/dissimilar) labeled training data provided for the specific application. The labels for pair-wise data may describe whether the pair of content items are similar or not. Additionally, multi-task learning may be used to cover various similarity learning tasks (e.g., human-labeled data, click-through data, etc.).

There are typically two types of content information: content data or item data related to the content itself (e.g., title, image(s), descriptions, keyword metadata, attributes, etc.), and content behavior data (e.g., behavior of customers and/or users with respect to the content). In the example depicted in FIG. 2, query data 114 represents a content item for which a compound feature 226 (e.g., a feature vector) is generated to represent the input content item. In FIG. 2 query data 114 comprises a title 202 ("Leather Accent Chair"), a description 206, and image data 204. Description 206 may describe attributes of the chair and image data 204 may be one or more images of the chair. A data representation of the content may be sent to one or more feature extraction model(s) 208 that may be trained to generate feature embeddings in various different domains. In various examples, the feature extraction model(s) 208 may be neural networks trained for a classification task. The various feature vectors (e.g., embedding data) may be extracted from one of the layers of the feature extraction model(s) 208 (e.g., the layer before the output layer) to generate semantically-rich feature data.

For example, an image feature extraction model may generate an image feature vector 216. The image feature extraction model may be, for example, any image classification model (e.g., a convolutional neural network (CNN)) trained using a plurality of labeled images. For example, Alexnet may be used to generate image feature vectors representing one or more images of content. In various examples, each of the feature extraction models 208 may be trained to focus on a particular domain. For example, a Word2Vec model or other language model may be trained to generate a title feature vector 218 representing a title of input content. Similarly, a separate machine learning model (e.g., a long short term memory (LSTM) model or other recurrent neural network or language model) may be trained to generate a description feature vector 220. Different features may be used to represent the query data 114 depending on the particular similarity task and/or depending on the particular content type represented by the query data 114. For example, for a similarity task that determines the similarity between books, it may not be important to use image feature 216. Instead, in an example, the title feature 218, description feature 220, content behavior feature 222, and/or a feature representing an average user review score for a given book may be used. In general, the particular features extracted and the feature extraction model(s) 208 used may depend on the similarity task and the type of content being examined.

Similarly, one or more behavior feature extraction models 214 may be trained to generate a content behavior feature vector 222 (sometimes referred to as a user behavior feature vector) representing user behavior signals 210 with respect to input content. In various examples, behavior feature extraction models 214 may be a graph network and/or a graph-based model. The user behavior signals 210 may represent that users that viewed or clicked on the leather accent chair represented by query data 114 also clicked on another content item or items. In another example, the user behavior signals 210 may represent that users that purchased the leather accent chair represented by query data 114 also purchased another content item or items.

The various feature vectors generated by feature extraction models 208 and/or behavior feature extraction models 214 may be concatenated (e.g., at concatenation 224) to generate a compound feature 226. Additionally, in various examples the feature vectors may be normalized prior to concatenation. Compound feature 226 may be a concatenation of the feature vectors output by feature extraction models 208 and/or behavior feature extraction models 214.

In various examples, the particular feature extraction model(s) 208 and/or behavior feature extraction model(s) 214 to be used to generate embedding data representing a content item may be selected for the particular application. Accordingly, the embedding data representing content may be optimized for the relevant similarity application/domain.

Figure 3:
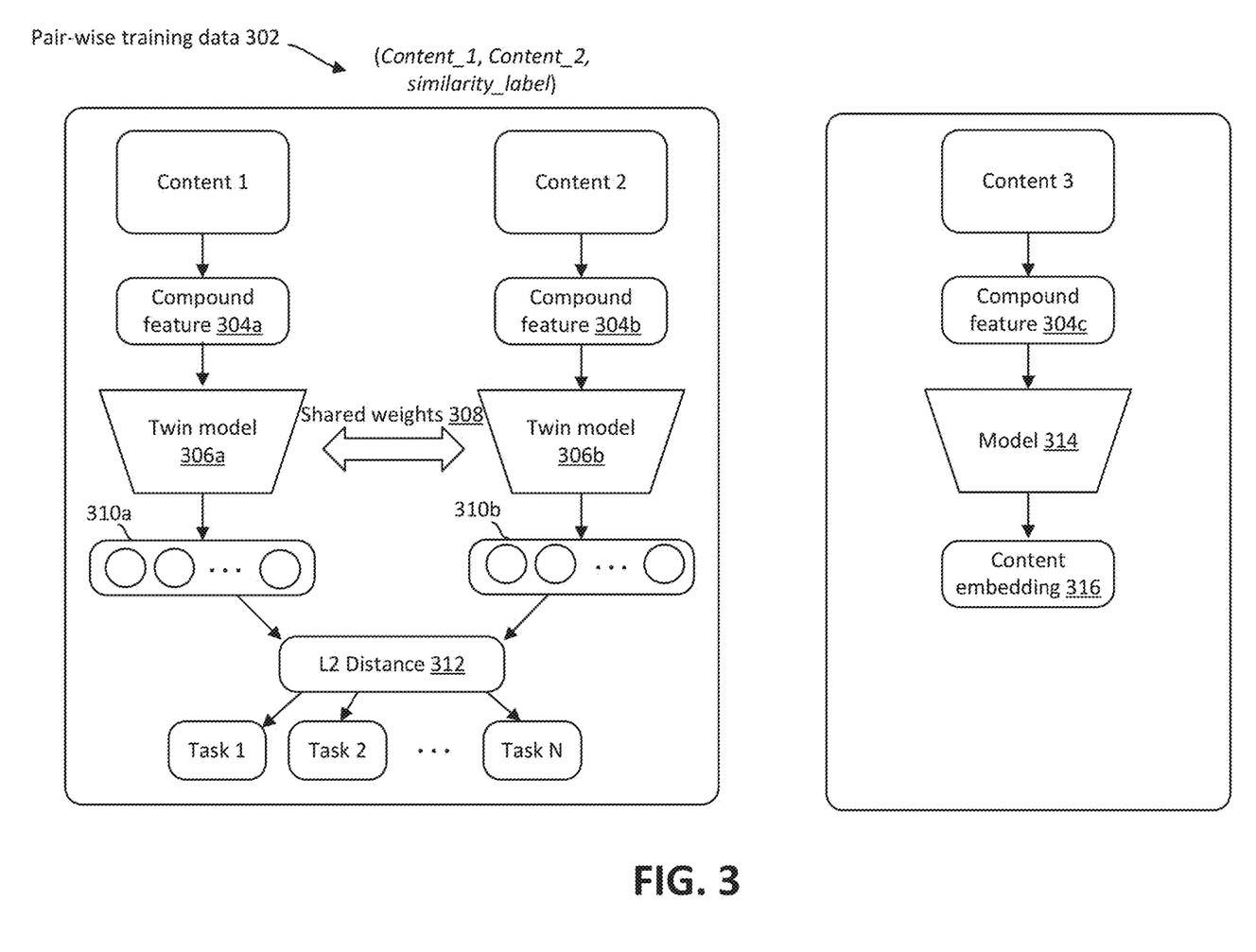
FIG. 3 depicts generation of content embedding data representing content, in accordance with various aspects of the present disclosure.

FIG. 3 depicts generation of content embedding data representing content, in accordance with various aspects of the present disclosure. The compound features 226 (e.g., compound feature vectors) generated may be accurate data representations of the content; however, the compound features 226 may not be optimized for the similarity determination task. Different techniques may be used to optimize the compound features 226 for similarity determination. In FIG. 3, a twin machine learning architecture is described.

However, it is to be appreciated that various other approaches can be used instead of a twin machine learning architecture to optimize the compound features 226 for similarity determination. For example, a triplet machine learning network may be used, a graph-based approach may be used, etc. Similarly, other types of loss and/or distances may be computed for the particular optimization techniques being used depending on the particular implementation. Accordingly, L2 distance 312 may be merely an example of such a loss that can be used during optimization for the similarity task.

FIG. 3 depicts a twin machine learning architecture (sometimes referred to as a SiameseNet) that may learn a more discriminate content embedding from a pair-wise similarity dataset. Additionally, the techniques described in reference to FIG. 3 may employ multi-task learning to enable the flexibility of optimizing for different similarity training datasets (e.g., for a user behavior similarity goal, for a human-labeled dataset similarity goal, etc.).

The left-hand side of FIG. 3 depicts a training stage for the twin machine learning architecture. During training, pair-wise training data (e.g., pair-wise training data 302) is received. Each instance of the pair-wise training data 302 may comprise an identification of first content (e.g., a uniform resource locator and/or a file comprising data representing the content), an identification of second content, and label data indicating whether or not the first content and second content are similar is received. In the example depicted in FIG. 3, content 1 and content 2 are received. The process described above in reference to FIG. 2 may be performed to generate respective compound features 304a and 304b for content 1 and content 2, respectively.

Compound feature 304a, representing content 1, is input into twin model 306a. Similarly, compound feature 304b, representing content 2, is input into twin model 306b. Twin models 306a and 306b may be described as "twins" as these models may have identical weights (e.g., shared weights 308 and/or other parameters, such as biases) and may use the same machine learning algorithm, activation function, etc. Feature vectors 310a and 310b may be extracted from twin models 306a and 306b, respectively. Feature vector 310a may represent compound feature 304a and feature vector 310b may represent compound feature 304b. An L2 distance (e.g., L2 distance 312) may be determined between feature vectors 310a and 310b for each relevant task (e.g., for Tasks 1, 2, . . . , N) for similarity prediction. The pair-wise loss (e.g., contrastive loss) of each optimization task (e.g., for Tasks 1, 2, . . . , N) may be computed and aggregation of weighted losses for all tasks may be determined as the final loss. Back propagation may be used to update weights of the twin models 306a and 306b to optimize for the tasks 1, 2, . . . , N.

Mathematically, for an item i, its compound feature $f_i$ will pass the L-layer of fully connected (FC) networks (e.g., the twin models which may be fully-connected feed forward networks (FFN)(•)). Each FC layer may be followed with a batch normalization layer in order to make the optimization more robust. Finally, the product embedding can be represented as the last hidden layer of the network:

$$h_i^L = FFN(f_i) \qquad (1)$$
$$= \sigma(\sigma(f_i W^{(1)} + b^{(1)})...)W^{(L)} + b^{(L)}$$

where $W^{(1)}$, $W^{(2)}$, . . . , $W^{(L)}$ are weight matrices and $b^{(1)}$, . . . , $b^{(L)}$ are biased terms. $\sigma(•)$ is the non-linear activation function (e.g., ReLu, sigmoid function, etc.).

A high quality product embedding is such that similar items are closer in terms of distance in the embedding space while dissimilar items away further away in the embedding space. Thus, the pair-wise objective function for a task t is:

$$L^t = \frac{1}{|M|} \sum_{(i,j) \in M} L^t_{ij}(y_{ij}, h_i, h_j) \quad (2)$$

$$L_{all} = \sum_{(t) \in \tau} \alpha_t * L^t$$

where $L_{ij}^t$ is the loss between the output of twin model 306a (e.g., "left branch output") $h_i$, and the output of twin model 306b (e.g., "right branch output") $h_1$ for task t. $y_{ij}$ is the pair-wise ground truth label (e.g., similar/dissimilar), M is the set of training pairs, and |M| is the training dataset size. T is the set of all tasks. In various examples, contrastive loss may be used for each task, and $L_{all}$ is the weighted aggregated loss for all tasks. Note FFN(•) is optimized with the learning of (2) and once model training is done, FFN(•) (e.g., model 314) can be used to generate product embeddings.

In some cases, a challenge of training a high quality product embedding from twin models (e.g., from SiameseNet) may be to find hard positive/negative training pairs. A naive approach is to randomly select products from the same category as positive pairs, and products from different categories as negative pair. However, such an approach typically yields many false positive pairs that do not meet the application requirements (e.g., simply pairing a sport style t-shirt and a hip-hop style t-shirt as "similar" might not be appropriate for a given similarity determination task), meanwhile the cross-category negatives may be simple to train, and the convergence may occur too quickly without the negatives meaningfully contributing to the learning.

In order to make the model training more efficient and gain flexibility for various similarity identification use cases, general similarity user behavior data sources may be leveraged (e.g., view-to-purchase similarity data) to mine positive and hard negative training pairs. Meanwhile, the various techniques described herein also support use of multiple training datasets as separate training tasks (e.g., a human labeled dataset) to explicitly assign positive/negative signals directly related to certain applications. For any given similarity data sources, cleaning steps may be used to collect high-quality positive and negative training samples. More specifically, for positive pair candidates, a cleaning step may be conducted to remove the data pairs that do not exhibit high similarity (e.g., cosine similarity<threshold_1, or some other suitable value) on either image/title/product behavior embeddings, etc. For negative training samples, the various techniques described herein may remove the pairs which have very high similarity (e.g., cosine similarity> threshold_2, or some other suitable value) from all embedding spaces.

After training using pair-wise training data 302, content 3 may be received. Content 3 may be, for example, a URL representing a particular item (e.g., including image data, description data, title data, user behavior data, etc.). Compound feature 304c may be generated for content 3 using, for example, the various techniques described above in reference to FIG. 2. Thereafter, the compound feature 304c may be input into model 314, which may be one of the twin models 306a, 306b after learning the product embedding for the particular similarity task using the techniques described above. Accordingly, model 314 may generate content embedding 316 (e.g., content embedding data) that may be used for the similarity task and may be stored in similarity dataset 130 (FIG. 1) in association with data identifying content 3. Embedding data may be generated for all content in a dataset of interest and may be used to determine similarity between content. For example, cosine similarity, Euclidean distance, and/or some other techniques may be used to determine the similarity between any two content items. In various examples, for a given content item represented by first embedding data, the most similar content item may be the item represented by second embedding data that is the closest distance to the first embedding data in the embedding space. Similar items may be stored in association with one another in similarity dataset 130. For example, for a given item, a ranked list of the most similar items may be stored in similarity dataset 130. In some examples, model 314 may be referred to as an embedding component as it generates the embedding data used for similarity determination.

In various examples, when a query is received (e.g., an identification of an item of content is received for which a user would like to determine the most similar content), embedding data may be generated for that content, as described above. Thereafter, the most similar embeddings to the embedding data may be determined in order to surface the most similar content stored in the similarity dataset 130. In various examples, recently-generated embedding data may be cached in order to avoid duplicative embedding data generation. For example, after receiving a query indicating a first content item, a cache may be searched to determine if embedding data is stored in the cache for the first content item. If so, the cached embedding data may be used, avoiding the need to re-compute the embedding data for the first content item. In various examples, the cache may be searched using identifier data representing the particular content item. Accordingly, the embedding data may be stored in associated with identifier data for the particular content.

Figure 4:
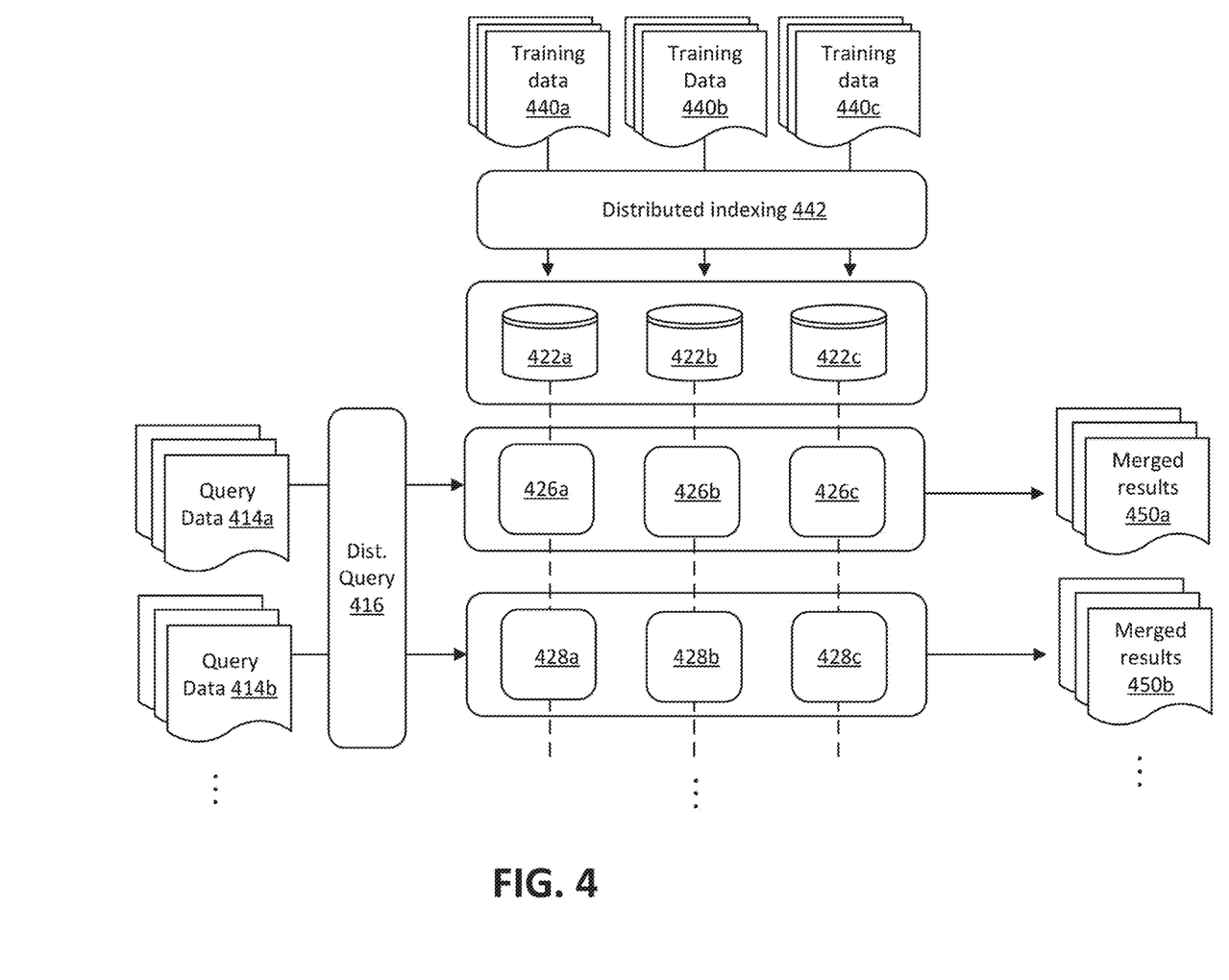
FIG. 4 depicts an example of similarity indexing and search, in accordance with various aspects of the present disclosure.

FIG. 4 depicts an example of similarity indexing and search, in accordance with various aspects of the present disclosure. After the embedding data generation (e.g., embedding generation 150) indexing/search 152 may be used to build efficient similarity indexes and may be used to perform similarity search in an accurate and scalable manner. In various examples, K Nearest Neighbors (KNN) may be used to perform similarity determination and search. There are usually two key components in KNN—index building and querying. The similarity indexing step organizes and records all the items in the search space (the set of content on which similarity is to be determined) with an indexing structure, (sometimes referred to as "index artifacts") that can support low latency search. Various indexing algorithms may be used to generate an indexing structure including, for example hierarchical navigable small-world graph (HNSW), K-D tree, etc. In various examples, HNSW may provide a balance between accurate similarity indexing and fast searching. The querying step retrieves similar items for each query from the built index artifacts. However, it may be challenging to 1) efficiently build an index for a large-scale search space; and 2) perform similarity search at scale.

A distributed KNN solution is illustrated in FIG. 4. To build the search space given a very large data set (e.g., billions of content items) that cannot fit into a single machine, the data set may be divided into multiple partitions (e.g., index partitions 422a, 422b, 422c, etc.). Distributed indexing 442 may be used to partition index partition training data 440a, 440b, 440c into the index partitions 422a, 422b, 422c, etc. Each index partition may be small enough, so it can be loaded into the memory of an index node and used to build a partitioned index. A set of the indices (e.g., index partitions 422a, 422b, 422c, etc.) built from the partitioned dataset may be considered as an index collection. The index collection may be referenced together to represent the entire search space for a given query. Similarly, query data is also partitioned (e.g., into query data 414a, 414b, etc.) and distributed to a cluster of query nodes (e.g., as queries 426a, 426b, 426c, 428a, 428b, 428c, etc.) using distributed query 416. Each query node may search in a partition index for the query partition and re-turn the sorted K nearest neighbors for each query in the partition. Finally, all partition results (e.g., query result data) from the same index collection will be pushed to a merge node to generate merged results (e.g., merged results 450a, 450b, . . . ). The merge node may sort the final top k most similar items from all candidate lists and upload them to the requested destination.

In various examples, the queries (e.g., query data 414a, 414b) may be batched before performing a search in parallel. In FIG. 4, query data 414a and 414b may each comprise a plurality of queries. Each query may comprise embedding data representing the query item (generating using embedding generation 150 described above in reference to FIGS. 1-3). The queries may be duplicated and may be sent to different database partitions. For example, query data 414a may be sent as query 426a to search index partition 422a. Similarly, query data 414a may be sent as another query 426b to search index partition 422b, and as query 426c to search index partition 422c, and so on. Results from all index partitions may be merged as merged results 450a. For example, the top k-most similar embeddings may be determined from among the search results from each index partition and may be combined into a ranked top k-most similar list of content for the given query data.

Figure 5:
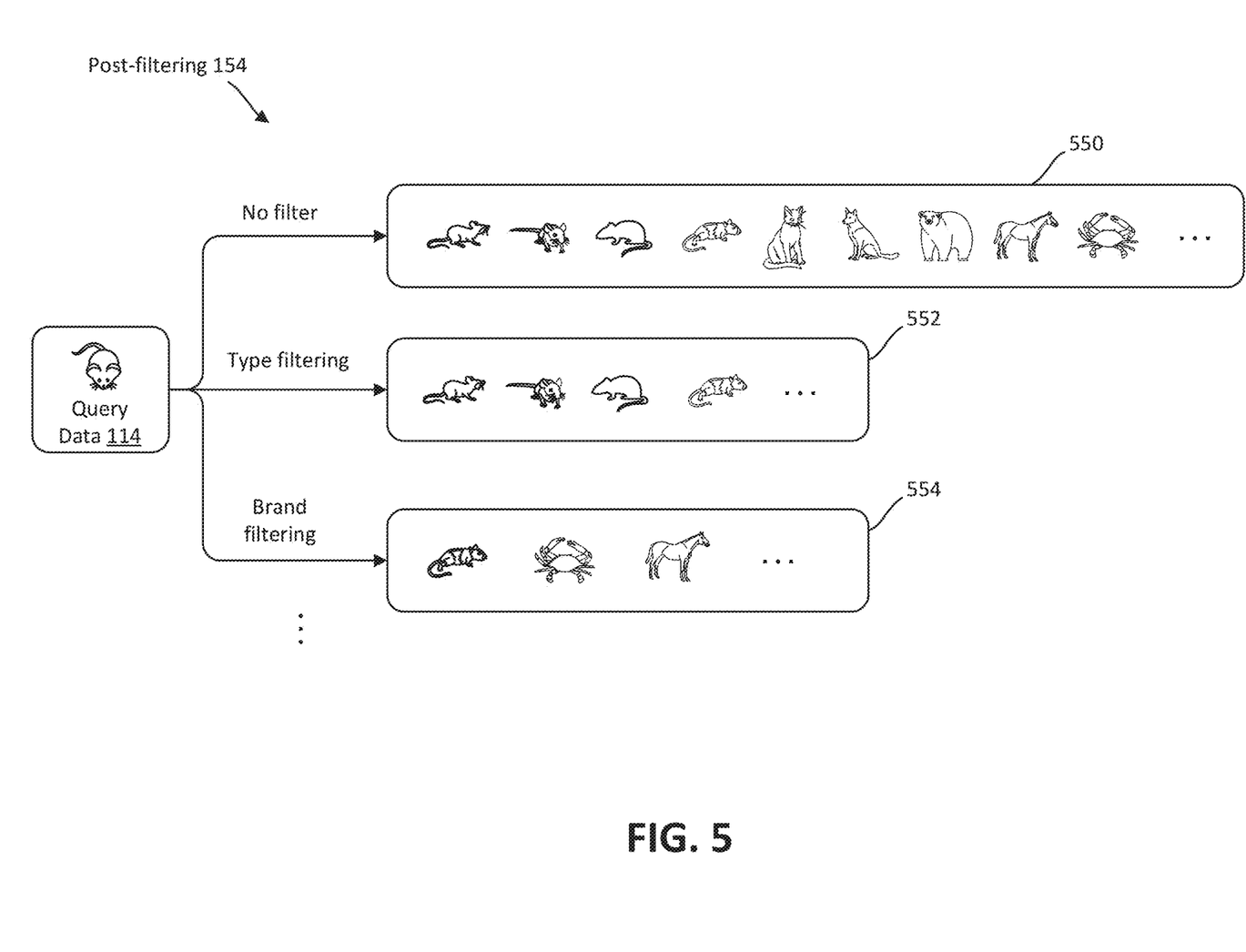
FIG. 5 depicts an example of post-filtering of search results that may be used may be used as a part of a content similarity determination system, in accordance with various embodiments described herein.

FIG. 5 depicts an example of post-filtering 154 of search results that may be used may be used as a part of a content similarity determination system, in accordance with various embodiments described herein. In various examples, after receiving the merged results from search (e.g., merged results 450a, 450b, etc.) various post-filters may be applied in order to impart additional constraints to make the similarity determination valid for the particular task. For example, two t-shirts may be identical in terms of color and graphics, but may be two different sizes. Accordingly, these shirts may be for completely different customers. Post-filtering 154 allows the various similarity determination techniques described herein the flexibility of adding application-specific constraints through configuring a list of key attributes for similarity identification. Any similarity candidates with un-matched attribute values may be removed (e.g., filtered out) using post-filtering 154.

In the example depicted in FIG. 5, query data 114 comprises a plush toy of a mouse. Similarity search results 550 (e.g., "search results") may be the merged results from across one or more partitions that have been determined to be similar to query data 114 (in the embedding space). As shown, the search results 550 may comprise different animal plush toys that have been determined to be similar to the plush toy identified in query data 114. No post-filtering 154 has been applied to the search results 550.

Conversely, search results 552 may have been filtered using a "type filter" filter attribute. For example, the different content items among the search results 552 may include a content attribute titled "type." In the example depicted in FIG. 5, a post-filter may be set to filter out search results with type content attributes other than "mouse." Accordingly, non-mouse plush toys have been filtered out of search results 552 (relative to search results 550).

Search results 554 may include a content attribute titled "brand." In the example, a post filter may be set to filter out search results that are not of a specified brand (e.g., filter attribute data may specify a particular brand). Accordingly, the plush toys (e.g., a mouse, crab, and horse) among search results 554 may all be of the brand specified using the post filter.

The foregoing post-filter examples are merely illustrative. Other post-filters may be used apart from those specifically mentioned. For example, color, size, genre, style, director, actor, artist, album, fit, availability in inventory, delivery time, etc., may be examples of post filters. In general, when a post filter is set, the search results may be checked and those search results with attribute values (e.g., metadata indicating a particular attribute value) that do not match the attribute value specified by the post filter may be removed from the search results to improve the quality of the similarity determination for the particular application.

In another example, query data 114 may represent a yellow sun dress. A post filter may be set to show only yellow dresses (or another specified color or colors) that have been determined to be similar to the input query data 114. In another example, a particular designer may be specified so that all results that are not associated with the designer are filtered out. In another example, a particular maximum price and/or minimum delivery time may be set using a post filter. Accordingly, returned results that do not include the attributes specified in the post filter may be filtered out prior to returning the results. For example, items classified as similar to the input query data 114, but which have prices above the price attribute and/or which have delivery times longer than the delivery attribute specified using post-filtering 154 may be filtered out.

Figure 6:
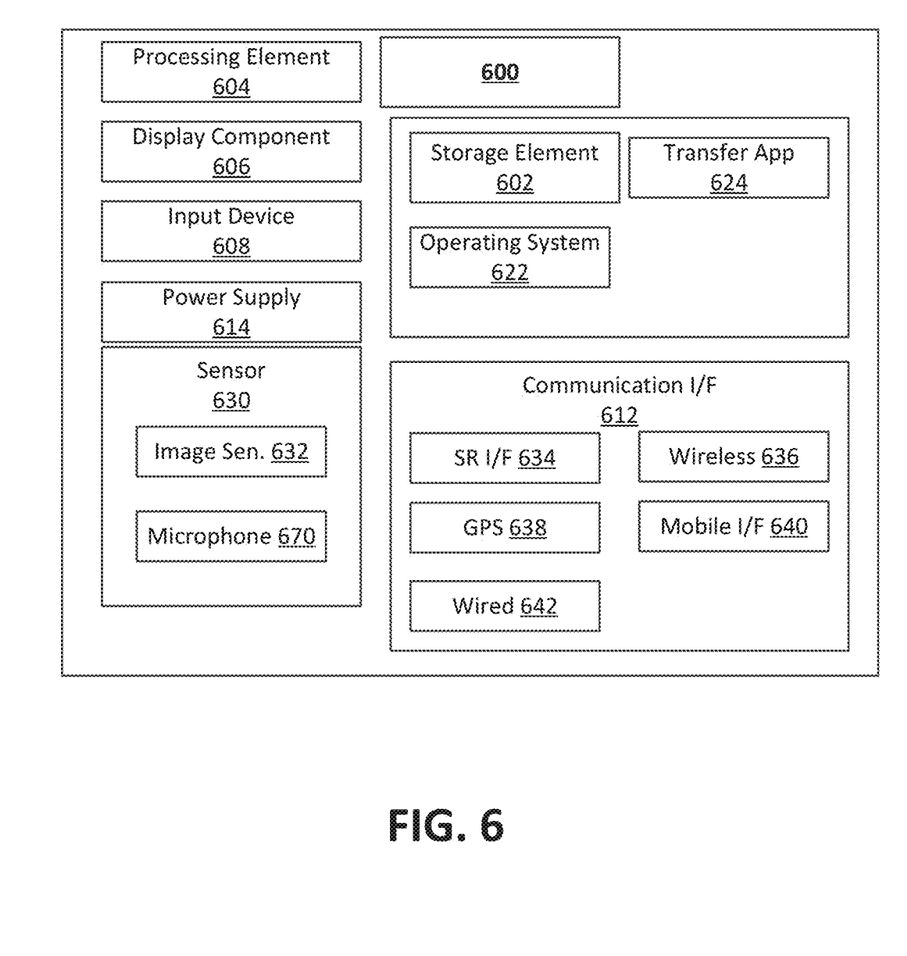
FIG. 6 is a block diagram showing an example architecture of a computing device that may be used in accordance with various aspects of the present disclosure.

FIG. 6 is a block diagram showing an example architecture 600 of a computing device that may be used to instantiate the various machine learning models, post-filtering technologies, and/or search/indexing technologies described herein, in accordance with various aspects of the present disclosure. It will be appreciated that not all devices will include all of the components of the architecture 600 and some user devices may include additional components not shown in the architecture 600. The architecture 600 may include one or more processing elements 604 for executing instructions and retrieving data stored in a storage element 602. The processing element 604 may comprise at least one processor. Any suitable processor or processors may be used. For example, the processing element 604 may comprise one or more digital signal processors (DSPs). The storage element 602 can include one or more different types of memory, data storage, or computer-readable storage media devoted to different purposes within the architecture 600. For example, the storage element 602 may comprise flash memory, random-access memory, disk-based storage, etc. Different portions of the storage element 602, for example, may be used for program instructions for execution by the processing element 604, storage of images or other digital works, and/or a removable storage for transferring data to other devices, etc. Additionally, storage element 602 may store parameters, and/or machine learning models generated using the various techniques described herein.

The storage element 602 may also store software for execution by the processing element 604. An operating system 622 may provide the user with an interface for operating the computing device and may facilitate communications and commands between applications executing on the architecture 600 and various hardware thereof. A transfer application 624 may be configured to receive images, audio, and/or video from another device (e.g., a mobile device, image capture device, and/or display device) or from an image sensor 632 and/or microphone 670 included in the architecture 600.

When implemented in some user devices, the architecture 600 may also comprise a display component 606. The display component 606 may comprise one or more light-emitting diodes (LEDs) or other suitable display lamps. Also, in some examples, the display component 606 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 606 may be effective to display suggested personalized search queries generated in accordance with the various techniques described herein.

The architecture 600 may also include one or more input devices 608 operable to receive inputs from a user. The input devices 608 can include, for example, a push button, touch pad, touch screen, wheel, joystick, keyboard, mouse, trackball, keypad, light gun, game controller, or any other such device or element whereby a user can provide inputs to the architecture 600. These input devices 608 may be incorporated into the architecture 600 or operably coupled to the architecture 600 via wired or wireless interface. In some examples, architecture 600 may include a microphone 670 or an array of microphones for capturing sounds, such as voice requests. In various examples, audio captured by microphone 670 may be streamed to external computing devices via communication interface 612.

When the display component 606 includes a touch-sensitive display, the input devices 608 can include a touch sensor that operates in conjunction with the display component 606 to permit users to interact with the image displayed by the display component 606 using touch inputs (e.g., with a finger or stylus). The architecture 600 may also include a power supply 614, such as a wired alternating current (AC) converter, a rechargeable battery operable to be recharged through conventional plug-in approaches, or through other approaches such as capacitive or inductive charging.

The communication interface 612 may comprise one or more wired or wireless components operable to communicate with one or more other computing devices. For example, the communication interface 612 may comprise a wireless communication module 636 configured to communicate on a network, such as the network 104, according to any suitable wireless protocol, such as IEEE 802.11 or another suitable wireless local area network (WLAN) protocol. A short range interface 634 may be configured to communicate using one or more short range wireless protocols such as, for example, near field communications (NFC), Bluetooth, Bluetooth LE, etc. A mobile interface 640 may be configured to communicate utilizing a cellular or other mobile protocol. A Global Positioning System (GPS) interface 638 may be in communication with one or more earth-orbiting satellites or other suitable position-determining systems to identify a position of the architecture 600. A wired communication module 642 may be configured to communicate according to the USB protocol or any other suitable protocol.

The architecture 600 may also include one or more sensors 630 such as, for example, one or more position sensors, image sensors, and/or motion sensors. An image sensor 632 is shown in FIG. 6. Some examples of the architecture 600 may include multiple image sensors 632. For example, a panoramic camera system may comprise multiple image sensors 632 resulting in multiple images and/or video frames that may be stitched and may be blended to form a seamless panoramic output. An example of an image sensor 632 may be a camera configured to capture color information, image geometry information, and/or ambient light information.

As noted above, multiple devices may be employed in a single system. In such a multi-device system, each of the devices may include different components for performing different aspects of the system's processing. The multiple devices may include overlapping components. The components of the computing devices, as described herein, are exemplary, and may be located as a stand-alone device or may be included, in whole or in part, as a component of a larger device or system.

Figure 7:
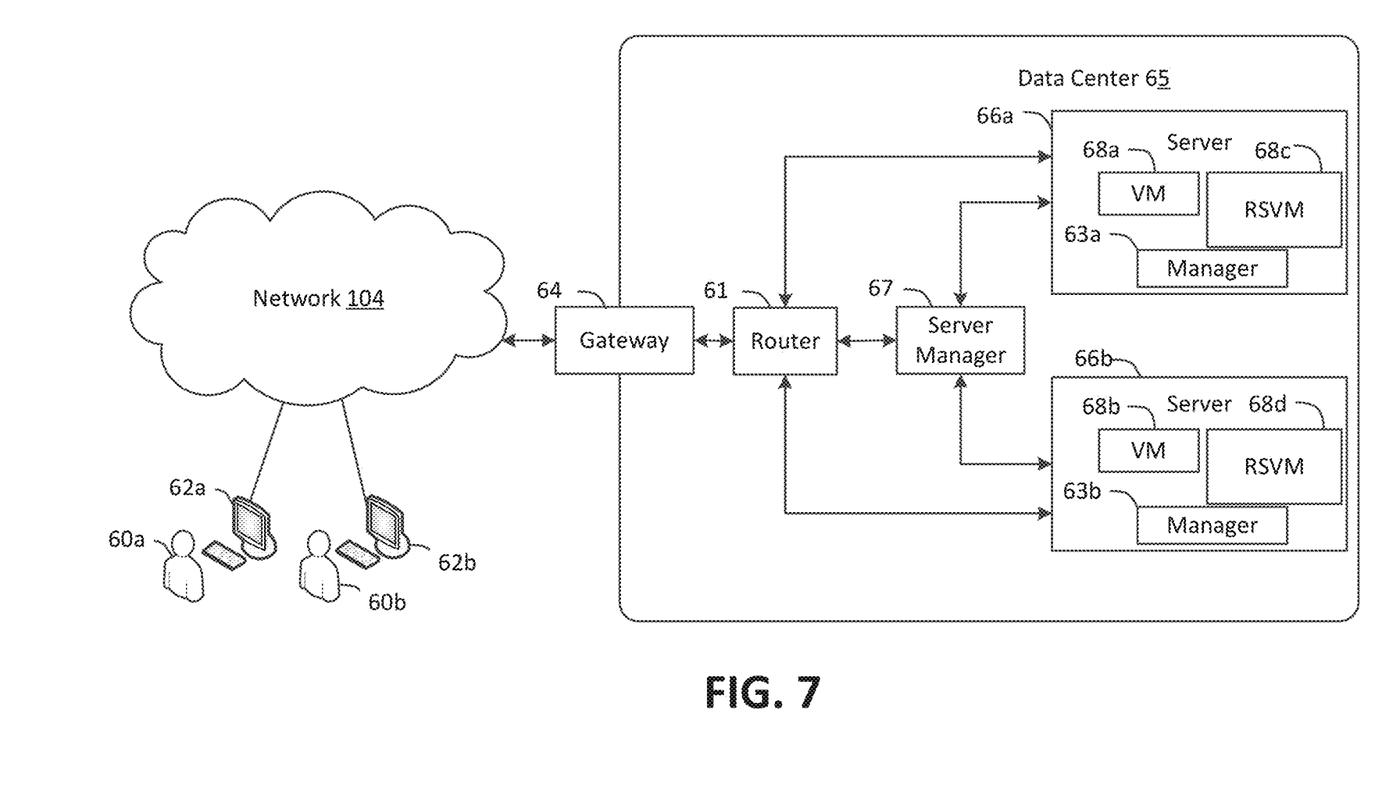
FIG. 7 is a diagram illustrating an example system for sending and providing data that may be used in accordance with the present disclosure.

An example system for sending and providing data will now be described in detail. In particular, FIG. 7 illustrates an example computing environment in which the embodiments described herein may be implemented. For example, the computing environment of FIG. 6 may be used to provide the various machine learning models described herein as a service over a network wherein one or more of the techniques described herein may be requested by a first computing device and may be performed by a different computing device configured in communication with the first computing device over a network. FIG. 7 is a diagram schematically illustrating an example of a data center 65 that can provide computing resources to users 60*a* and 60*b* (which may be referred herein singularly as user 60 or in the plural as users 60) via user computers 62*a* and 62*b* (which may be referred herein singularly as user computer 62 or in the plural as user computers 62) via network 104. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. In various examples, the instances may be configured to execute one or more of the various machine learning techniques described herein.

These services may be configurable with set or custom applications and may be configurable in size, execution, cost, latency, type, duration, accessibility and in any other dimension. These web services may be configured as available infrastructure for one or more clients and can include one or more applications configured as a system or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 65 may include servers 66a and 66b (which may be referred herein singularly as server 66 or in the plural as servers 66) that provide computing resources. These resources may be available as bare metal resources or as virtual machine instances 68a-d (which may be referred herein singularly as virtual machine instance 68 or in the plural as virtual machine instances 68). In at least some examples, server manager 67 may control operation of and/or maintain servers 66. Virtual machine instances 68c and 68d are rendition switching virtual machine ("RSVM") instances. The RSVM virtual machine instances 68c and 68d may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large-scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 104 may, for example, be a publicly accessible network of linked networks and possibly operated by various distinct parties, such as the Internet. In other embodiments, network 104 may be a private network, such as a corporate or university network that is wholly or partially inaccessible to non-privileged users. In still other embodiments, network 104 may include one or more private networks with access to and/or from the Internet.

Network 104 may provide access to user computers 62. User computers 62 may be computers utilized by users 60 or other customers of data center 65. For instance, user computer 62a or 62b may be a server, a desktop or laptop personal computer, a tablet computer, a wireless telephone, a personal digital assistant (PDA), an e-book reader, a game console, a set-top box or any other computing device capable of accessing data center 65. User computer 62a or 62b may connect directly to the Internet (e.g., via a cable modem or a Digital Subscriber Line (DSL)). Although only two user computers 62a and 62b are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 6 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63a or 63b (which may be referred herein singularly as instance manager 63 or in the plural as instance managers 63) capable of executing the virtual machine instances 68. The instance managers 63 may be a virtual machine monitor (WM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 6, a router 61 may be utilized to interconnect the servers 66a and 66b. Router 61 may also be connected to gateway 64, which is connected to network 104. Router 61 may be connected to one or more load balancers, and alone or in combination may manage communications within networks in data center 65, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 6, a data center 65 is also employed to at least in part direct various communications to, from and/or between servers 66a and 66b. While FIG. 6 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location or other attributes associated with user computers 62, a nature of a task with which the communications are associated, a priority of a task with which the communications are associated, a duration of a task with which the communications are associated, a size and/or estimated resource usage of a task with which the communications are associated and many other factors. Data center 65 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 65 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, used to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example, computer servers, storage devices, network devices, and the like. In some embodiments, a client or user may be provided direct access to a resource instance, e.g., by giving a user an administrator login and password. In other embodiments, the provider network operator may allow clients to specify execution requirements for specified client applications and schedule execution of the applications on behalf of the client on execution systems (such as application server instances, Java™ virtual machines (JVMs), general-purpose or special-purpose operating systems that support various interpreted or compiled programming languages such as Ruby, Perl, Python, C, C++, and the like, or high-performance computing systems) suitable for the applications, without, for example, requiring the client to access an instance or an execution system directly. A given execution system may utilize one or more resource instances in some implementations; in other implementations, multiple execution systems may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware system, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments, the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method of determining similarity between content, comprising:
    generating, for first content, first embedding data representing the first content, wherein the first embedding data is generated using an image feature vector, a title feature vector, a description feature vector, and a user behavior feature vector related to user interaction with the first content;
    generating a plurality of queries comprising the first embedding data;
    sending a first query of the plurality of queries to a first database partition;
    receiving a first query result from the first database partition, wherein the first query result comprises second content associated with second embedding data that is a first closest distance from the first embedding data in an embedding space shared by the first embedding data and the second embedding data;
    sending a second query of the plurality of queries to a second database partition;
    receiving a second query result from the second database partition, wherein the second query result comprises third content associated with third embedding data that is a second closest distance from the first embedding data in the embedding space;
    determining filter attribute data representing a first content attribute;
    determining that the second content includes the first content attribute and that the third content does not include the first content attribute; and
    generating result data comprising the second content, wherein the result data represents content classified as similar to the first content.

2. The method of claim 1, further comprising:
    training an embedding component to generate at least one of the first embedding data, the second embedding data, and the third embedding data using pair-wise training data comprising:
        first item data describing a first item;
        second item data describing a second item; and
        label data indicating whether or not the first item and the second item are similar items.

3. The method of claim 1, further comprising:
    generating, for the first content by an image feature extraction model, the image feature vector representing at least one image of the first content;
    generating, for the first content by a language model, at least one of the title feature vector or the description feature vector;
    generating, for the first content, the user behavior feature vector using a graph network;

concatenating the image feature vector, the title feature vector, the description feature vector, and the user behavior feature vector to generate compound feature data; and generating the first embedding data based at least in part on the compound feature data.

4. A method comprising:

receiving first data identifying a first similarity task from among a plurality of similarity tasks;

determining a first set of features associated with the first similarity task;

generating first embedding data for first content based at least in part on the first data, wherein the first embedding data is generated using the first set of features;

generating a first query comprising the first embedding data;

sending the first query to a first database partition;

determining, based at least in part on the first embedding data, a first search result representing second content;

generating a second query comprising the first embedding data;

sending the second query to a second database partition different from the first database partition;

determining, based at least in part on the first embedding data, a second search result representing third content; and generating output data comprising at least one of the first search result and the second search result, the output data representing content classified as similar to the first content.

5. The method of claim 4, further comprising:

generating an image feature vector representing an image of the first content using a first machine learning model;

generating a text feature vector representing text associated with the first content; and generating the first embedding data comprising the image feature vector and the text feature vector.

6. The method of claim 4, further comprising:

generating a user behavior feature vector representing user interactions with the first content and other content; and generating the first embedding data comprising the user behavior feature vector.

7. The method of claim 4, further comprising:

receiving filter data representing a content attribute;

determining that the second content does not include the content attribute; and removing the second content from the output data.

8. The method of claim 4, further comprising:

receiving identifier data associated with fourth content;

searching a cache using the identifier data; and retrieving second embedding data for the fourth content from the cache.

9. The method of claim 4, further comprising:

determining a position of the first embedding data in an embedding space; and determining k nearest neighbors to the position of the first embedding data in the embedding space, wherein the first search result is among the k nearest neighbors.

10. The method of claim 4, further comprising:

generating a compound feature vector representing an image of the first content and text associated with the first content;

modifying the compound feature vector to generate the first embedding data, wherein a machine learning model is trained to modify the compound feature vector using pair-wise training data comprising:

first item data describing a first item;
second item data describing a second item; and
label data classifying the first item and the second item as either similar or dissimilar.

11. The method of claim 4, further comprising:

receiving, from a first entity, first identifier data associated with a first item;

determining a first machine learning model associated with the first entity;

generating, using the first machine learning model, second embedding data for the first item, wherein the second embedding data is generated using an image of the first item;

receiving, from a second entity, second identifier data associated with a second item;

determining a second machine learning model associated with the second entity; and generating, using the second machine learning model, third embedding data for the second item, wherein the third embedding data is generated using an image of the second item and text of the second item.

12. The method of claim 4, further comprising:

storing the output data in a first data structure in association with data representing the first content, wherein the first data structure comprises:

a plurality of items; and for each item of the plurality of items, a list of one or more items classified as similar to the respective item.

13. A system comprising:

at least one processor; and at least one non-transitory computer-readable memory storing instructions that, when executed by the at least one processor, are effective to cause the at least one processor to:

receive first data identifying a first similarity task from among a plurality of similarity tasks;

determine a first set of feature data corresponding to the first similarity task, the first set of feature data comprising at least one image feature and at least one text feature;

generate first embedding data for first content based at least in part on the first data, wherein the first embedding data is generated using the first set of features;

generate a first query comprising the first embedding data;

send the first query to a first database partition;

determine, based at least in part on the first embedding data, a first search result representing second content;

generate a second query comprising the first embedding data;

send the second query to a second database partition different from the first database partition;

determine, based at least in part on the first embedding data, a second search result representing third content; and generate output data comprising at least one of the first search result and the second search result, the output data representing content classified as similar to the first content.

14. The system of claim 13, wherein the at least one non-transitory computer-readable memory stores further instructions that, when executed by the at least one processor, are further effective to cause the at least one processor to:

generate an image feature vector representing an image of the first content using a first machine learning model;

generate a text feature vector representing text associated with the first content; and generate the first embedding data comprising the image feature vector and the text feature vector.

15. The system of claim 13, wherein the at least one non-transitory computer-readable memory stores further instructions that, when executed by the at least one processor, are further effective to cause the at least one processor to:

generate a user behavior feature vector representing user interactions with the first content and other content; and generate the first embedding data comprising the user behavior feature vector.

16. The system of claim 13, wherein the at least one non-transitory computer-readable memory stores further instructions that, when executed by the at least one processor, are further effective to cause the at least one processor to:

determine filter data representing a content attribute;

determine that the second content does not include the content attribute; and remove the second content from the output data.

17. The system of claim 13, wherein the at least one non-transitory computer-readable memory stores further instructions that, when executed by the at least one processor, are further effective to cause the at least one processor to:

determine identifier data associated with fourth content;

search a cache using the identifier data; and retrieve second embedding data for the fourth content from the cache.

18. The system of claim 13, wherein the at least one non-transitory computer-readable memory stores further instructions that, when executed by the at least one processor, are further effective to cause the at least one processor to:

determine a position of the first embedding data in an embedding space; and determine k nearest neighbors to the position of the first embedding data in the embedding space, wherein the first search result is among the k nearest neighbors.

19. The system of claim 13, wherein the at least one non-transitory computer-readable memory stores further instructions that, when executed by the at least one processor, are further effective to cause the at least one processor to:

generate a compound feature vector representing an image of the first content and text associated with the first content;

modify the compound feature vector to generate the first embedding data, wherein a machine learning model is trained to modify the compound feature vector using pair-wise training data comprising:

first item data describing a first item;

second item data describing a second item; and label data classifying the first item and the second item as either similar or dissimilar.

20. The system of claim 13, wherein the at least one non-transitory computer-readable memory stores further instructions that, when executed by the at least one processor, are further effective to cause the at least one processor to:

determine first identifier data received from a first entity and associated with a first item;

determine a first machine learning model associated with the first entity;

generate, using the first machine learning model, second embedding data for the first item, wherein the second embedding data is generated using an image of the first item;

determine second identifier data received from a second entity and associated with a second item;

determining a second machine learning model associated with the second entity; and generating, using the second machine learning model, third embedding data for the second item, wherein the third embedding data is generated using an image of the second item and text of the second item.

* * * * *